(12) United States Patent
Fechner

(10) Patent No.: US 11,236,671 B2
(45) Date of Patent: Feb. 1, 2022

(54) AIR SUPPLY SYSTEM FOR AN AIRCRAFT

(71) Applicant: ROLLS-ROYCE DEUTSCHLAND LTD & CO KG, Blankenfelde-Mahlow (DE)

(72) Inventor: Stefan Fechner, Berlin (DE)

(73) Assignee: ROLLS-ROYCE DEUTSCHLAND LTD & CO KG, Blankenfelde-Mahlow (DE)

( * ) Notice: Subject to any disclaimer, the term of this patent is extended or adjusted under 35 U.S.C. 154(b) by 248 days.

(21) Appl. No.: 16/508,789

(22) Filed: Jul. 11, 2019

(65) Prior Publication Data

US 2020/0025074 A1 Jan. 23, 2020

(30) Foreign Application Priority Data

Jul. 17, 2018 (DE) ...................... 10 2018 211 907.4

(51) Int. Cl.
  *F02C 6/08* (2006.01)
  *B64D 13/06* (2006.01)
  *B64D 27/12* (2006.01)

(52) U.S. Cl.
  CPC ............... *F02C 6/08* (2013.01); *B64D 13/06* (2013.01); *B64D 27/12* (2013.01); *B64D 2013/0618* (2013.01); *F05D 2260/601* (2013.01); *F05D 2270/3062* (2013.01)

(58) Field of Classification Search
  CPC ... F02C 6/08; B64D 13/06; B64D 2013/0618; F05D 2260/601; F05D 2270/3062
  See application file for complete search history.

(56) References Cited

U.S. PATENT DOCUMENTS

| | | | | |
|---|---|---|---|---|
| 3,367,256 A | * | 2/1968 | Townsend .............. | B64D 13/02 454/73 |
| 3,441,045 A | * | 4/1969 | Malone .................. | B64D 13/00 137/114 |
| 4,285,466 A | * | 8/1981 | Linscheid .......... | G05D 23/1393 165/298 |
| 4,711,084 A | * | 12/1987 | Brockett .................. | F02C 3/32 60/785 |

(Continued)

OTHER PUBLICATIONS

German Search Report dated Apr. 26, 2019 for counterpart German Patent Application No. 10 2018 211 907.4.

(Continued)

*Primary Examiner* — Alain Chau
(74) *Attorney, Agent, or Firm* — Shuttleworth & Ingersoll, PLC; Timothy J. Klima

(57) ABSTRACT

An air supply system for a gas turbine engine including a first duct which is connected or capable of being connected to a first compressor bleed air supply of a gas turbine engine; a second duct which downstream of the first compressor bleed air supply is connected or capable of being connected to a second compressor bleed air supply of the gas turbine engine; a nozzle by way of which air from the second duct is capable of being blown into the first duct; and an exhaust air duct having an opening which downstream of the nozzle is disposed in the first duct in such a manner that air blown by way of the nozzle into the first duct can flow out of the first duct through the opening into the exhaust air duct. A gas turbine engine and an aircraft are furthermore provided.

12 Claims, 4 Drawing Sheets

(56) References Cited

U.S. PATENT DOCUMENTS

| | | | | |
|---|---|---|---|---|
| 6,305,156 | B1* | 10/2001 | Lui | B64D 13/06 |
| | | | | 60/785 |
| 6,701,715 | B2* | 3/2004 | Anderson | F02C 3/32 |
| | | | | 417/187 |
| 7,797,945 | B2* | 9/2010 | Appleby | F04D 27/0215 |
| | | | | 60/795 |
| 7,823,390 | B2 | 11/2010 | Eluripati et al. | |
| 8,128,347 | B2* | 3/2012 | Sokhey | F04D 27/0215 |
| | | | | 415/144 |
| 8,726,672 | B2* | 5/2014 | Ciofini | F01D 9/065 |
| | | | | 60/782 |
| 9,260,974 | B2* | 2/2016 | Hasting | F01D 11/24 |
| 10,138,812 | B2* | 11/2018 | Heaton | F01D 25/183 |
| 2010/0170265 | A1* | 7/2010 | Whaling | F02C 3/32 |
| | | | | 60/785 |
| 2011/0072827 | A1* | 3/2011 | Ciofini | F02C 7/12 |
| | | | | 60/772 |
| 2012/0045317 | A1* | 2/2012 | Saladino | F02C 6/08 |
| | | | | 415/145 |
| 2015/0252683 | A1 | 9/2015 | Hasting et al. | |
| 2017/0233081 | A1* | 8/2017 | Sautron | F02C 9/18 |
| | | | | 60/783 |
| 2018/0045074 | A1 | 2/2018 | Sinha et al. | |
| 2018/0057171 | A1 | 3/2018 | Sautron | |

OTHER PUBLICATIONS

German Search Office Action dated Nov. 11, 2021 for counterpart German Patent Application No. 10 2018 211 907.4.

\* cited by examiner

AIR SUPPLY SYSTEM FOR AN AIRCRAFT

This application claims priority to German Patent Application DE102018211907.4 filed Jul. 17, 2018, the entirety of which is incorporated by reference herein.

The present disclosure relates to an air supply system, to a gas turbine engine, and to an aircraft according to the present disclosure.

Air supply systems for providing air from gas turbine engines to an aircraft cabin can retrieve bleed air from various compressor stages and mix said air in such a manner that air is provided at a predefined pressure.

In order for a higher pressure to be achieved in the air provided, a larger proportion of air can be retrieved from a compressor stage that is situated further downstream. However, the air retrieved there also has a higher temperature so that the mixed air has a temperature which may be higher than desired. In the case of variable engine outputs one difficulty typically lies in at all times providing air at a predefined pressure and a predefined, in particular not excessively high, temperature.

It is an object of the present invention to provide an improved air supply system.

According to one aspect, an air supply system, in particular for a gas turbine engine, for example of an aircraft, is provided. The air supply system comprises a first duct which is connected or capable of being connected to a first compressor bleed air supply of the gas turbine engine; a second duct which downstream of the first compressor bleed air supply is connected or capable of being connected to a second compressor bleed air supply of the gas turbine engine; a nozzle by way of which air from the second duct is capable of being blown into the first duct; and an exhaust air duct having an opening which downstream of the nozzle is disposed in the first duct in such a manner that air blown by way of the nozzle into the first duct can flow out of the first duct through the opening into the exhaust air duct.

In this way, an improved air supply system which can in particular provide air at a high pressure and a comparatively low temperature is provided. The bleed air from the second duct is blown into the first (in particular larger) duct through a type of Venturi passage. The blown-in bleed air has an increased velocity. The blown-in air (Venturi air) accelerates the bleed air from the first compressor bleed air supply on account of viscous friction (within the first duct). Prior to the air flows completely mixing, which would lead to a higher temperature, the (warmer) air blown in from the second compressor bleed air supply is discharged again and is mixed only to an insignificant extent, or only partially, with the bleed air from the first compressor bleed air supply. The remaining air that has not been discharged can be provided at an interface, for example, for impinging an aircraft cabin with a predefined pressure and a comparatively low temperature.

The opening of the exhaust air duct is optionally designed so as to be adaptive to the nozzle, and/or oriented toward the nozzle (in particular can be oriented thereto in a variable manner). On account thereof, the blown-in air can be discharged in a variable manner.

The air supply system optionally comprises one or a plurality of adjustable valves, in particular an adjustable valve in the exhaust air duct and/or an adjustable valve in the second duct (bleed air duct). The pressure and the temperature of the provided air can thus be set to predefined or predefinable values for various conditions (in particular in the case of different momentary engine outputs).

The air supply system can comprise a control installation for controlling at least one valve as a function of a predefined pressure and/or a predefined temperature.

The air supply system in one design embodiment comprises a flow rate meter in the first duct, in the second duct (bleed air duct), and/or in the exhaust air duct. The flow rate meter or meters can be connected to the control installation and provide measured values to the control installation. For example, at least one flow rate meter is in each case provided in the first duct, in the second duct, and in the exhaust air duct.

Optionally, the second duct in portions, or at least in portions, extends within the first duct. For example, the second duct has a smaller cross section than the first duct.

In one design embodiment, the opening diameter (in particular the opening cross-sectional area) of an opening of the nozzle is smaller than the opening diameter (in particular the opening cross-sectional area) of the opening of the exhaust duct. One or both openings can be circular. The two openings can be mutually oriented so as to be coaxial.

According to one aspect, a gas turbine engine, in particular a gas turbine engine for an aircraft, is provided. The gas turbine engine comprises an air supply system according to any design embodiment described herein.

According to one aspect, an aircraft, for example an airplane, comprising an air supply system according to any design embodiment described herein, and/or a gas turbine engine according to any design embodiment described herein, is provided.

The skilled person will appreciate that, except where mutually exclusive, a feature or parameter described in relation to any one of the above aspects may be applied to any other aspect. Furthermore, any feature or any parameter described herein can be applied to any aspect and/or combined with any other feature or parameter described herein, unless they are mutually exclusive.

Embodiments are now described in an exemplary manner with reference to the figures, in which.

Figure 1:
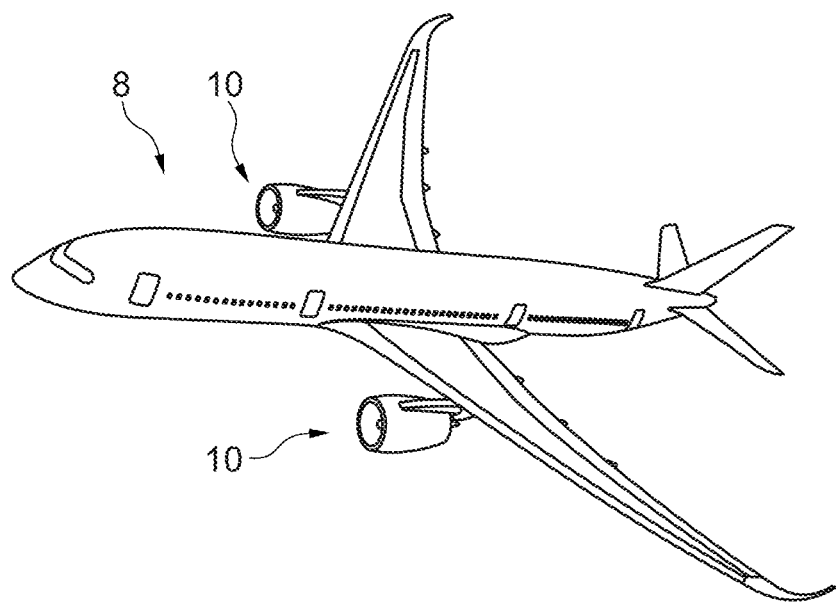
FIG. 1 shows an aircraft having a plurality of gas turbine engines.

FIG. 1 shows an aircraft 8 in the form of a passenger airplane. The aircraft 8 comprises a plurality of gas turbine engines 10.

One or a plurality of the gas turbine engines 10 by way of an air supply system is connected to a passenger cabin of the aircraft 8 in order to supply the passenger cabin with air in such a manner that a predefined air pressure in the passenger cabin is maintained during the flight of the aircraft 8.

Before the air supply system is explained in more detail, one of the gas turbine engines 10 of the aircraft 8 will first be described in the following with reference to FIG. 2.

Figure 2:
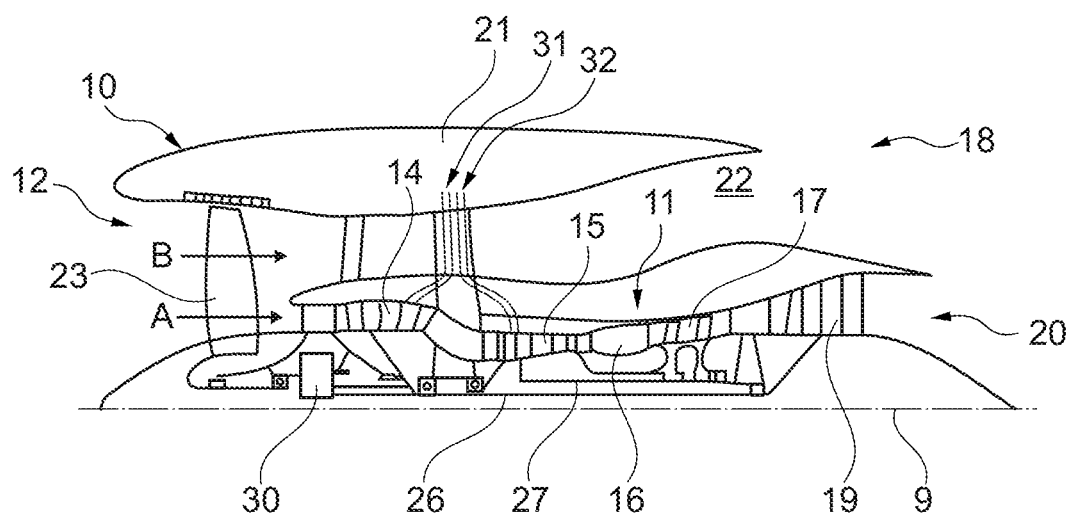
FIG. 2 shows a lateral sectional view of a gas turbine engine of the aircraft.

FIG. 2 illustrates the gas turbine engine 10 with a main rotation axis 9. The gas turbine engine 10 comprises an air inlet 12 and a fan 23 that generates two air flows: a core air flow A and a bypass air flow B. The gas turbine engine 10 comprises a core 11 that receives the core air flow A. When viewed in the order corresponding to the axial direction of flow, the core engine 11 comprises a low-pressure compressor 14, a high-pressure compressor 15, a combustion installation 16, a high-pressure turbine 17, a low-pressure turbine 19 and a core thrust nozzle 20. An engine nacelle 21 surrounds the gas turbine engine 10 and defines a bypass duct 22 and a bypass thrust nozzle 18. The bypass air flow B flows through the bypass duct 22. The fan 23 is attached to and driven by the low-pressure turbine 19 via a shaft 26 and an (optional) epicyclic planetary gear box 30.

In operation, the core air flow A is accelerated and compressed by the low-pressure compressor 14 and directed into the high-pressure compressor 15 where further compression takes place. The compressed air expelled from the high-pressure compressor 15 is directed into the combustion installation 16, where it is mixed with fuel and the mixture is combusted. The resultant hot combustion products then expand through, and thereby drive, the high-pressure and low-pressure turbines 17, 19 before being expelled through the nozzle 20 to provide some propulsive thrust. The high-pressure turbine 17 drives the high-pressure compressor 15 by means of a suitable interconnecting shaft 27. The fan 23 generally makes available the majority of the propulsive thrust. The (optional) epicyclic planetary gear box 30 is a reduction gear box.

Optionally, the gear box can drive additional and/or alternative components (e.g. the intermediate pressure compressor and/or a booster compressor).

Other gas turbine engines to which the present disclosure can be applied can have alternative configurations. For example, engines of this type can have an alternative number of compressors and/or turbines and/or an alternative number of connecting shafts. By way of further example, the gas turbine engine shown in FIG. 2 has a split flow nozzle 20, 22, meaning that the flow through the bypass duct 22 has its own nozzle that is separate to and radially outside the core engine nozzle 20. However, this is not limiting, and any aspect of the present disclosure can also apply to engines in which the flow through the bypass duct 22 and the flow through the core 11 are mixed, or combined, before (or upstream of) a single nozzle, which can be referred to as a mixed flow nozzle. One or both nozzles (whether mixed or split flow) can have a fixed or variable area. Whilst the described example relates to a turbofan engine, the disclosure may be applied, for example, to any type of gas turbine engine, such as an open rotor (in which the fan stage is not surrounded by an engine nacelle) or turboprop engine, for example.

The geometry of the gas turbine engine 10, and components thereof, is/are defined by a conventional axis system, comprising an axial direction (which is aligned with the rotation axis 9), a radial direction (in the bottom-to-top direction in FIG. 2), and a circumferential direction (perpendicular to the view in FIG. 2). The axial, radial and circumferential directions run so as to be mutually perpendicular.

The gas turbine engine 10 comprises a first compressor bleed air supply 31 and a second compressor bleed air supply 32. Both compressor bleed air supplies 31, 32 are (fluidically) connected to a compressor 14, 15 of the gas turbine engine 10 in such a manner that bleed air of the respective compressor 14, 15 can be delivered to the compressor bleed air supply 31, 32. The two compressor bleed air supplies 31, 32 then provide the bleed air for further use.

The compressor bleed air supplies 31, 32 in the example shown comprise in each case one air line which is fluidically connected to an interior space of the respective compressor 14, 15.

The first compressor bleed air supply 31 is presently connected to the low-pressure compressor 14. The second compressor bleed air supply 32 is connected to the high-pressure compressor 15 (thus at a location downstream of the first compressor bleed air supply 31). Alternatively, both compressor bleed air supplies 31, 32 could be connected to the low-pressure compressor 14 or to the high-pressure compressor 15, wherein the second compressor bleed air supply 32 downstream of the first compressor bleed air supply 31 is connected to the compressor 14, 15.

Figure 3:
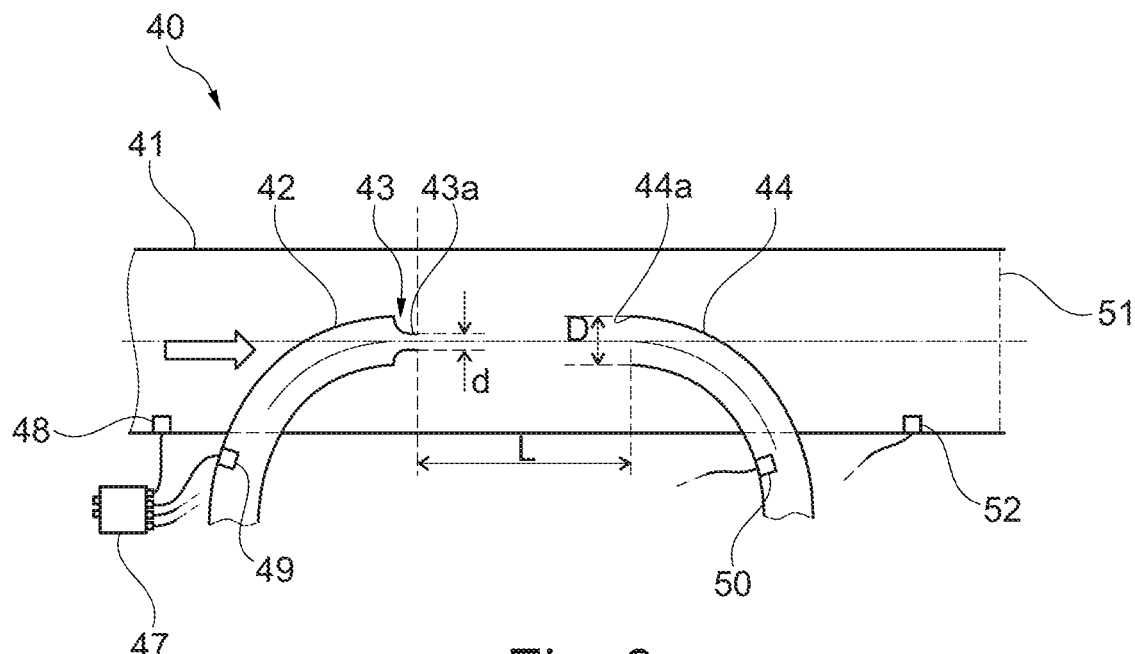
FIG. 3 shows a sectional view of an air supply system of the gas turbine engine, having a first duct, a second duct, and an exhaust air duct.

FIG. 3 shows an air supply system 40 of the aircraft 8. The air supply system 40 is disposed, for example, on or in the gas turbine engine 10, in particular on or in the engine nacelle 21.

The air supply system 40 has an interface 51 by way of which the air supply system 40 can provide air to the passenger cabin. Optionally, the air supply system 40 by way of the interface 51 is connected to an air conditioning plant of the aircraft 8.

The air supply system 40 comprises a first duct 41 and a second duct 42. The first duct 41 is connected to the first compressor bleed air supply 31 in such a manner (presently at one end) that said first duct 41 can be supplied with bleed air from the first compressor bleed air supply 31. In the example shown, the interface 51 is configured at an end of the first duct 41 (at the second end of the latter).

The second duct 42 is connected to the second compressor bleed air supply 32 in such a manner that said second duct 42 can be supplied with bleed air from the second compressor bleed air supply 32. The first and/or the second duct 41, 42 are/is configured as a pipe or hose, for example.

The second duct 42 protrudes into the first duct 41. The second duct 42, at least in this region, has a smaller diameter than the first duct 41. The first duct 41, at least in the portion in which the second duct 42 is disposed within the first duct 41, is presently rectilinear. The second duct 42 penetrates a wall of the first duct 41. The second duct 42 in the interior of the first duct 41 has a curvature.

The air supply system 40 furthermore comprises a nozzle 43 at one end of the second duct 42. The nozzle 43 is disposed within the first duct 41. The nozzle 43 is disposed such that bleed air from the second duct 42 is capable of being blown through the nozzle 43 into the interior of the first duct 41. The nozzle 43 in the example shown is oriented so as to be coaxial with the first duct 41. The nozzle 43 is furthermore oriented such that the bleed air blown through the nozzle 43 into the first duct 41 has the same flow direction as the bleed air which emanates from the first compressor bleed air supply 31 and flows through the first duct 41 (visualized by means of arrows in FIG. 3).

The bleed air provided by the second compressor bleed air supply 32 has a higher pressure and a higher temperature than the bleed air provided by the first compressor bleed air supply 31. The nozzle 43 has an opening 43a where the nozzle 43 opens into the first duct 41. The opening 43a of the nozzle 43 has an opening diameter d which is smaller than the diameter of the second duct 42 close to the nozzle 43. The nozzle 43 therebetween continuously tapers off (along the flow direction). The bleed air of the second duct 42 by way of the nozzle 43 is blown into the first duct 41 at an increased flow velocity. On account of viscous friction, the bleed air blown from the nozzle 43 into the first duct 41 at a higher velocity accelerates the remaining bleed air flowing through the first duct 41. The higher velocity of the air that is capable of being provided by way of the interface 51 can be used for generating a higher cabin pressure.

However, the bleed air blown in through the nozzle 43 does also have a higher temperature than the bleed air provided by the second compressor bleed air supply 32 to the first duct 41. Were both air flows to completely mix, the temperature of the air provided at the interface 51 would be increased in a corresponding manner.

In order for a high pressure to be provided at a comparatively low temperature, the air supply system 40 furthermore comprises an exhaust air duct 44. The exhaust air duct 44 has an opening 44a. The opening 44a is disposed downstream of the nozzle 43, specifically so that the bleed air that flows through the second duct 42 and the nozzle 43 into the first duct 41 can flow out through the opening 44a of the exhaust air duct 44 into the exhaust air duct 44. The opening 44a of the exhaust air duct 44 is specifically oriented toward the opening 43a of the nozzle 43. Both openings 43a, 44a are mutually oriented so as to be coaxial. Both openings 43a, 44a are disposed within the first duct 41. The nozzle 43 and the exhaust air duct 44 (in the flow direction) are mutually spaced apart by a spacing having a length L. On account thereof, the bleed air from the first compressor bleed air supply 31 is accelerated over the length L by the bleed air flowing in by way of the nozzle 43 (visualized in FIG. 4).

The opening 44a of the exhaust air duct 44 has an opening diameter D which is larger than the opening diameter d of the opening 43a of the nozzle 43. Optionally, the second duct 42 and the exhaust air duct 44 (at least in portions, in particular within the first duct 41) have a substantially identical diameter.

Before the bleed air blown in through the nozzle 43 substantially mixes with the bleed air from the first compressor bleed air supply 31 flowing in through the first duct 41, the former is discharged through the exhaust air duct 44. In this way it is possible for air having a particularly high pressure and simultaneously a low temperature to be provided by way of the interface 51.

The exhaust air duct 44 (at the end thereof that is opposite the opening 44a) opens out in the bypass duct 22, for example, or on an external surface of the engine nacelle 21.

Figure 4:
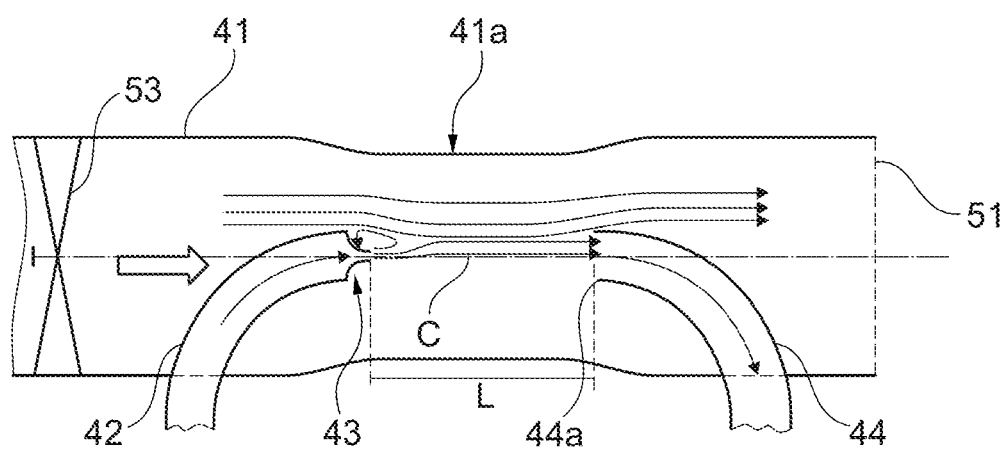
FIG. 4 shows a sectional view of an air supply system for the gas turbine engine, having a first duct, a second duct, and an exhaust air duct.

FIG. 4 shows a potential design embodiment of the first duct 41 of the air supply system 40, having a constriction 41a. The diameter of the first duct 41 in the region of the constriction 41a is reduced in size as compared to neighboring regions. The constriction 41a in the example shown extends from the opening 43a of the nozzle 43 to the opening 44a of the exhaust air duct 44. The flow velocity is increased in the region of the constriction 41a.

Figure 5:
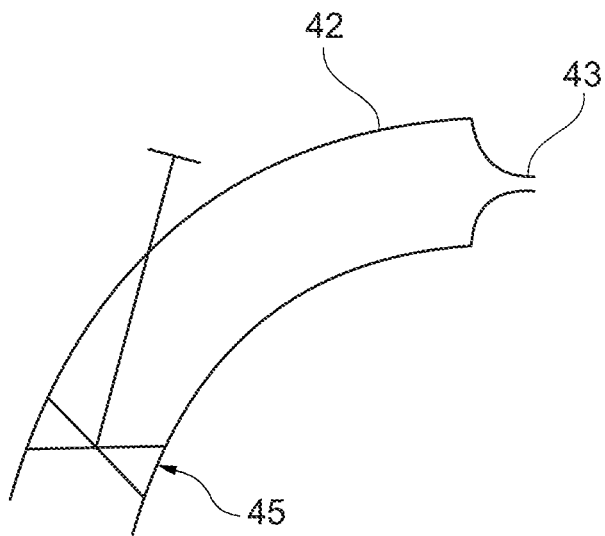
FIG. 5 shows a second duct having an adjustable valve for the air supply system according to FIG. 3 or 4.

FIG. 5 shows the second duct 42 having an optional valve 45. The valve 45 is configured for controlling the flow rate of bleed air through the second duct 42.

Figure 6:
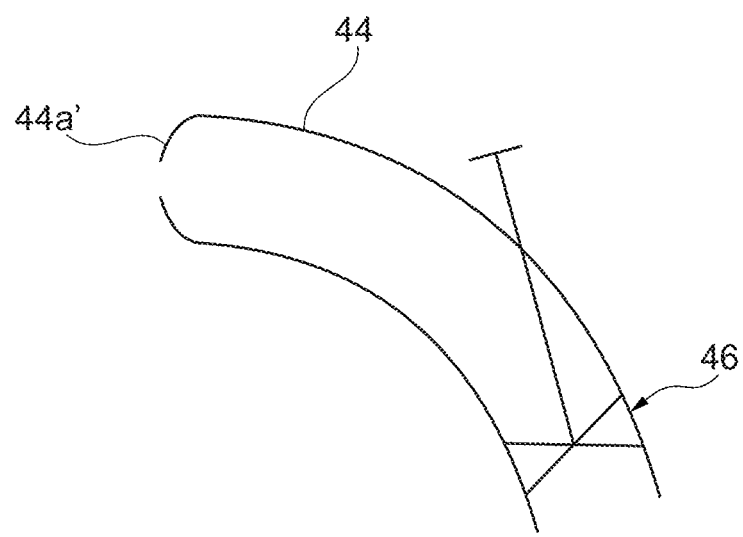
FIG. 6 shows an exhaust air duct having an adjustable valve for the air supply system according to FIG. 3 or 4.

FIG. 6 shows the exhaust air duct 44 having an optional valve 46. The valve 46 is configured for controlling the flow rate of bleed air through the exhaust air duct 44.

A valve 53 is also optionally provided on the first duct 41 (see FIG. 4).

The valves 45, 46, 53 are adjustable, for example in each case by means of an actuator. The valves 45, 46, 53 are connected to a control installation 47 of the air supply system 40 (see in particular FIG. 3) and are adjustable by control signals of the control installation 47. The control installation 47 is configured for adjusting the valves 45, 46, 53 as a function of one or a plurality of predefined or predefinable value(s) for pressure and/or temperature of the air provided by means of the air supply system 40.

Depending on the air pressure at which air is to be provided at the interface 51, a larger or smaller quantity of bleed air per unit of time can be blown through the nozzle 43 into the first duct 41, for example. Depending on what temperature the air is to have, the valves 45, 46 can be adjusted such that the air blown in through the nozzle 43 is substantially completely or only partially discharged through the exhaust air duct 44, for example.

The air supply system 40 furthermore comprises a plurality of (optional) flow rate meters 48-50. In each case at least one flow rate meter 48-50 for measuring the flow rate through the first duct 41 is disposed on the first duct 41, for measuring the flow rate through the second duct 42 is disposed on the second duct 42, and for measuring the flow rate through the exhaust air duct 44 is disposed on the exhaust air duct 44.

The control system 40 optionally comprises at least one temperature probe 52 which in the example shown is disposed close to the interface 51.

The control installation 47 comprises a plurality of input connectors to which sensors, specifically the flow rate meters 48-50 and the temperature probe 52, are connected. Values for a pressure to be provided and/or a temperature to be provided are optionally capable of being entered by way of at least one input connector. The control installation 47 is configured for controlling at least one valve 45, 46, 53 as a function of signals provided at the input connectors (generally of at least one input connector).

As is visualized in FIG. 6, the exhaust air duct 44 can optionally have an opening 44a' having a constricted diameter.

Figure 7:
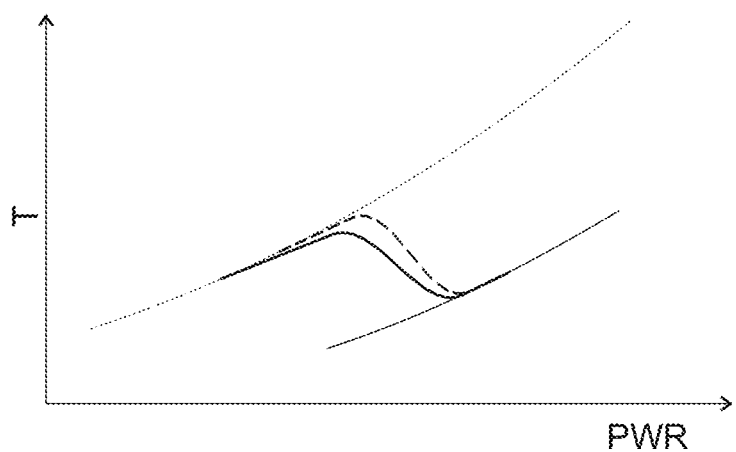
FIG. 7 shows a diagram which schematically illustrates the temperature of the air provided as a function of an output provided by the gas turbine engine.

FIG. 7 shows the temperature T of the bleed air of the first compressor bleed air supply 31 (solid thin line) and of the second compressor bleed air supply 32 (dotted thin line) as a function of the engine output PWR. In the case of a low engine output PWR, bleed air of the second compressor bleed air supply 32 can predominantly or exclusively be provided at the interface 51; in the case of a comparatively high engine output PWR, bleed air of the first compressor bleed air supply 31 can predominantly or exclusively be provided at the interface 51. In the case (or at least in the case) of medium engine outputs PWR, bleed air flows from the first and from the second compressor bleed air supplies 31, 32 can be used for providing air having a sufficient, in particular predefined, pressure at a particularly low temperature (solid bold line).

The control installation 47 is configured for controlling the valves 45, 46, 53 in a corresponding manner.

For comparison, the dashed line shows a potential profile without the use of an exhaust air duct 44. It can be seen that lower temperatures are achievable by using the exhaust air duct 44.

It goes without saying that the invention is not limited to the above-described embodiments, and various modifications and improvements can be made without departing from the concepts described herein. Any of the features can be used separately or in combination with any other features, as long as these are not mutually exclusive, and the disclosure extends to all combinations and subcombinations of one or more features which are described herein and includes them.

LIST OF REFERENCE SIGNS

8 Aircraft
9 Main rotation axis

10 Gas turbine engine
11 Core engine
12 Air inlet
14 Low-pressure compressor
15 High-pressure compressor
16 Combustion installation
17 High-pressure turbine
18 Bypass thrust nozzle
19 Low-pressure turbine
20 Core thrust nozzle
21 Engine nacelle
22 Bypass duct
23 Fan
26 Shaft
27 Interconnecting shaft
30 Gear box
31 First compressor bleed air supply
32 Second compressor bleed air supply
40 Air supply system
41 First duct
41a Constriction
42 Second duct
43 Nozzle
43a Opening
44 Exhaust air duct
44a; 44a' Opening
45, 46 Valve
47 Control installation
48-50 Flow rate meter
51 Interface
52 Temperature probe
53 Valve
A Core air flow
B Bypass air flow
C Air flow
d, D Opening diameters
L Length

The invention claimed is:

1. An air supply system for a gas turbine engine, comprising:
   a first duct connected to a first compressor bleed air supply of the gas turbine engine;
   a second duct downstream of the first compressor bleed air supply and connected to a second compressor bleed air supply of the gas turbine engine;
   a nozzle configured to blow air from the second duct into the first duct; and
   an exhaust air duct, separate from the first duct and positioned in the first duct, the exhaust air duct including an opening positioned downstream of the nozzle, and an outlet opening connected to a bypass duct of the gas turbine engine or to an external surface of an engine nacelle, such that air blown from the nozzle into the first duct flows out of the first duct through the opening of the exhaust air duct and then flows through the exhaust air duct to the bypass duct of the gas turbine engine or to the external surface of the engine nacelle.

2. The air supply system according to claim 1, wherein the opening of the exhaust air duct is oriented toward the nozzle.

3. The air supply system according to claim 1, and further comprising an adjustable valve positioned in the exhaust air duct.

4. The air supply system according to claim 3, and further comprising a control installation configured to control the adjustable valve as a function of a predefined pressure and/or a predefined temperature.

5. The air supply system according to claim 1, and further comprising an adjustable valve positioned in the second duct.

6. The air supply system according to claim 1, and further comprising a flow rate meter positioned in the first duct, in the second duct, and/or in the exhaust air duct.

7. The air supply system according to claim 1, wherein at least a portion of the second duct extends within the first duct.

8. The air supply system according to claim 1, wherein an opening diameter of an opening of the nozzle is smaller than an opening diameter of the opening of the exhaust air duct.

9. An aircraft, comprising an air supply system according to claim 1.

10. A gas turbine engine, comprising an air supply system according to claim 1.

11. An aircraft, comprising the gas turbine engine according to claim 10.

12. An air supply system for a gas turbine engine, comprising:
   a first duct connected to a first compressor bleed air supply of the gas turbine engine;
   a second duct downstream of the first compressor bleed air supply and connected to a second compressor bleed air supply of the gas turbine engine;
   a nozzle configured to blow air from the second duct into the first duct; and
   an exhaust air duct, separate from the first duct and positioned in the first duct, the exhaust air duct including an opening positioned downstream of the nozzle, and an outlet opening connected to a bypass duct of the gas turbine engine or to an external surface of an engine nacelle, such that air blown from the nozzle into the first duct flows out of the first duct through the opening of the exhaust air duct;
   wherein the exhaust air duct is positioned and configured to remove a predominant portion of the air blown from the nozzle.

* * * * *